June 5, 1962   J. M. SUKALA   3,037,819
MECHANICAL LOCK FOR AIR BRAKES
Filed May 9, 1961   2 Sheets-Sheet 2
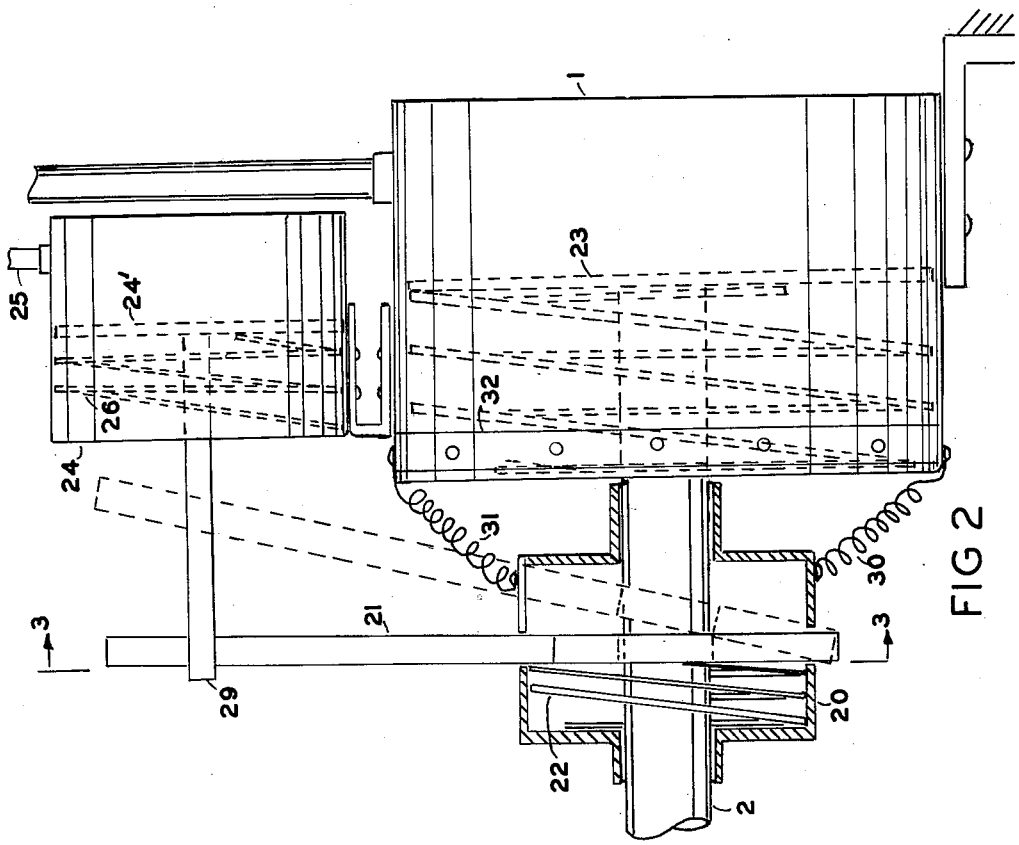
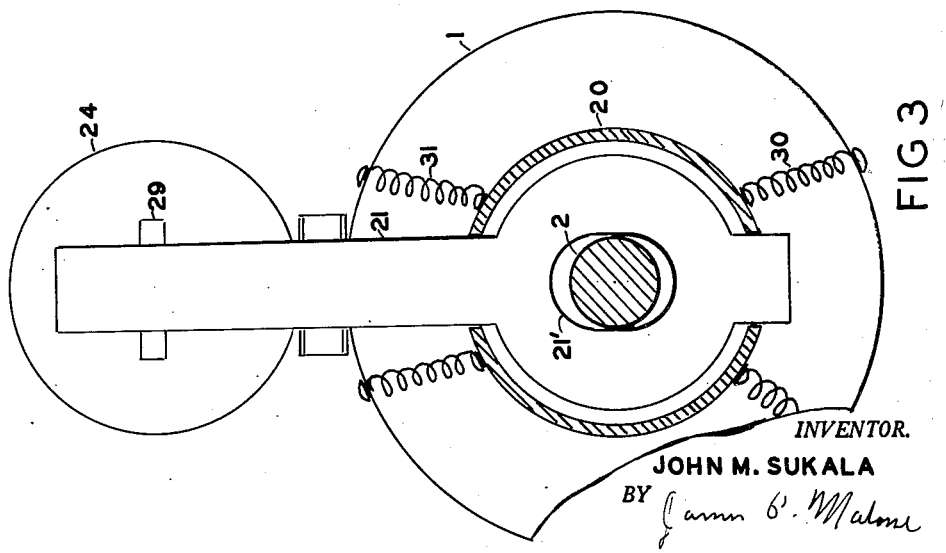
INVENTOR.
JOHN M. SUKALA
BY

United States Patent Office 3,037,819
Patented June 5, 1962

3,037,819
MECHANICAL LOCK FOR AIR BRAKES
John M. Sukala, Bridgeton, N.J.
(801 Norman Drive, North Bellmore, N.Y.)
Filed May 9, 1961, Ser. No. 108,942
3 Claims. (Cl. 303—89)

This invention relates to mechanical locking means for air or vacuum operated brakes and more particularly to means for mechanically locking such brakes so that the vehicle cannot be moved when there is insufficient pressure in the supply lines to the brakes.

One of the great difficulties in operating trucks and tractor trailers using air brakes is that after the vehicle has been parked for some time the air pressure generally leaks away so that the vehicle is left without brakes. This results in runaway equipment and considerable potential liability for property damage and personal injury.

The present invention is designed and built to prevent runaway equipment due to loss of vacuum or air. It works equally as well with air or vacuum powered brakes, is virtually maintenance free, requires no lubrication or adjustment after installation and is completely automatic.

More particularly the present invention comprises a mechanical lock which is adapted to be added on to existing air brake systems without any modification of the air brake system. The present lock comprises a cylindrical member having a spring loaded lever which is adapted to fit over the existing brake actuating rod. The lever has an elongated hole to receive the actuating rod and when the lever is tilted the actuating rod is mechanically locked. When the lever is straight there is no locking of the actuating rod. The lever is normally held in the straight unlocked position by means of a pressure device connected to the air supply line. When the air supply decreases to a predetermined level, then the mechanical lock is applied.

Accordingly, a principal object of the invention is to provide new and improved mechanical locking means for fluid pressure brakes such as air or vacuum brakes.

Another object of the invention is to provide new and improved mechanical locking means for fluid pressure brakes which may be added to existing brakes simply and inexpensively without modifying the existing equipment.

Another object of the invention is to provide new and improved mechanical locking means for fluid pressure brakes which are adapted to mechanically lock the brakes but which are uni-directional so that the present lock may be applied first and then the brakes applied, for instance, by the emergency relay valve.

Another object of the present invention is to provide a mechanical lock which is spring mounted to the existing brake cylinder so that the brake may be applied even if the present device froze.

Another object of the present invention is to provide new and improved mechanical locking means for brakes which may be manually released.

Another object of the invention is to provide new and improved mechanically locked emergency brakes.

Another object of the present invention is to provide new and improved mechanical locking means for fluid pressure brakes which are economical, simple and of rugged construction.

Another object of the invention is to provide new and improved uni-directional mechanical locking means for fluid pressure brakes of the type having an actuating rod comprising a uni-directional clamping lock mounted on said rod adjacent the existing motor for actuating the rod, spring means connecting the lock to said motor, said lock being actuated by a lever, and means to hold the lever in unlocked position comprising a pressure device connected to the brake supply pressure system.

These and other objects of the invention will be apparent from the following specification and drawings, of which FIG. 1 is a schematic diagram illustrating a conventional brake system utilizing the present invention.

FIG. 2 is a side sectional view of an embodiment of the present invention.

FIG. 3 is a sectional view taken along the lines 3—3 of FIG. 2.

Figure 1:
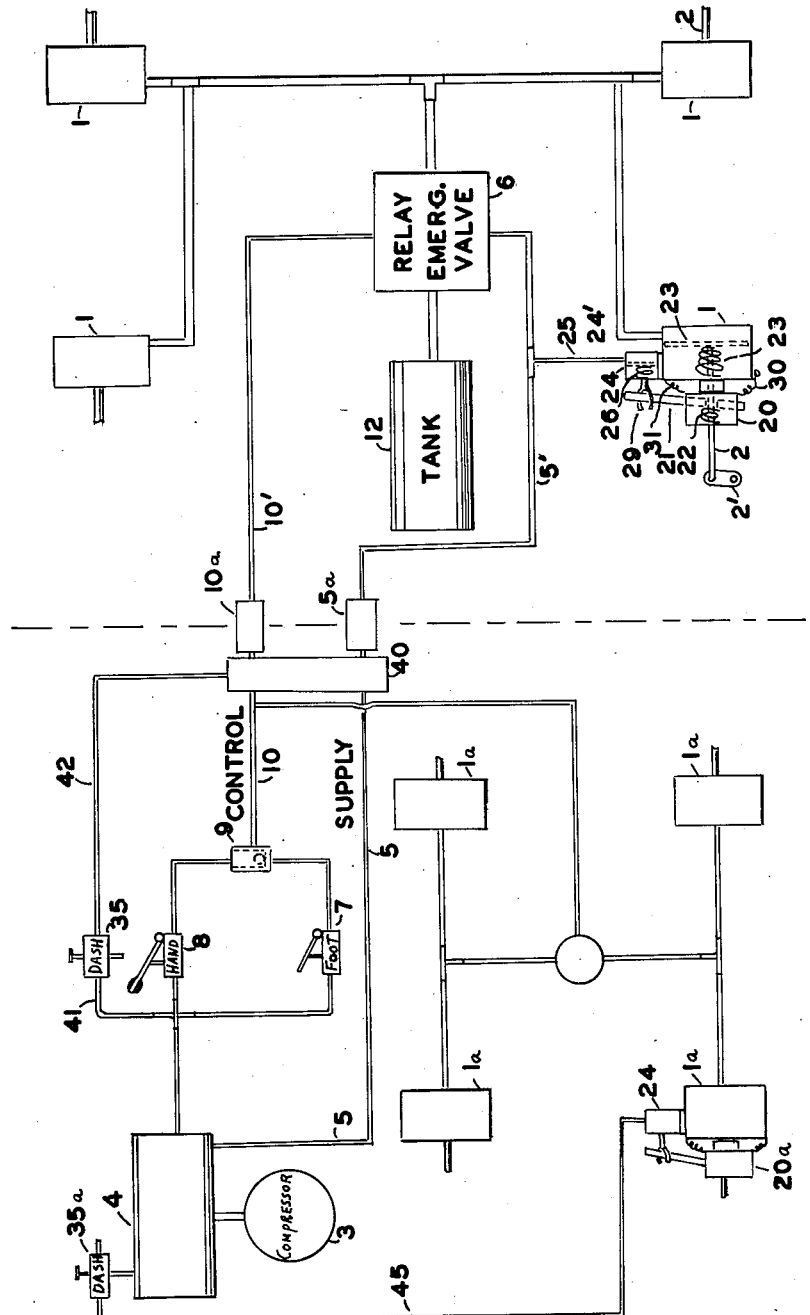

FIG. 1 shows a schematic diagram of a conventional tractor-trailer air brake system of the general type shown in Patents 2,380,507 and 2,451,139 having pressure responsive motor means 1 and 1a for actuating a brake rod 2 to apply the brakes to the respective wheels. In FIG. 1 the tractor portion is shown on the lefthand side.

The air pressure is supplied by a compressor 3 to a tank 4. The air pressure is supplied from the tank 4 through the conduits 5 and 5' and conventional tractor protection valve 40 to a conventional relay emergency valve 6 located in the trailer. The emergency relay valve may be conventional, for instance of the type shown in Patent 2,380,507. The valve 6 is normally controlled by a foot operated valve 7 or hand operated valve 8, both of which are conventional, which apply control pressure through the check valve 9 through conduits 10, 10' and conventional tractor protection valve 40 to the relay valve 6. The control line 10 is connected to the line 10' in the trailer by means of the connector 10a and the supply line or so-called emergency line 5 is connected to the supply line 5' in the trailer by means of the connector 5a. An emergency pressure tank 12 is mounted in the trailer where it is normally kept up to full pressure through the relay valve 6 in conventional manner. The purpose of the tank 12 is that if the supply line 5, 5' is disconnected or broken then the emergency valve 6 applies the trailer brakes in conventional manner.

The conventional dashboard mounted valve 35 connects pressure from tank 4 to the tractor protection valve 40.

When valve 35 is in normal "In" position lines 41 and 42 are connected and air pressure is applied to conventional tractor protection valve 40 which then connects lines 10 to 10' and line 5 to 5'.

When valve 35 is moved to "Out" position line 41 is sealed and line 42 is vented. This causes tractor protection valve 40 to seal lines 5 and 10 and vent lines 5' and 10', thereby actuating emergency relay valve 6 to lock the trailer brakes. Valve 35 is moved to "Out" position when parking the trailer.

The apparatus thus far described is conventional. The mechanical lock of the present invention comprises a hollow cylinder 20 which has a pivotally mounted lever 21 which is spring loaded by the spring 22. The lever 21 has an elongated hole 21' which is adapted to fit over the brake actuating rod 2 so that when the lever is tilted the rod is prevented from releasing the brake. However the brake may be applied when the mechanical lock is in "locked" or tilted position since the brake piston 23 can apply the rod 2 to the left in FIGS. 1 and 2 since the lever 21 will yield against the spring pressure. However, the lock is unidirectional and will not permit any movement of the rod 2 to the right in FIG. 1 until the lever 21 is moved to the unlocked or vertical position.

The lever 21 is normally held in the vertical position by means of the pressure cylinder 24 which is connected to the supply line by means of the conduit 25. The pressure member 24 has a piston 24' which is moved to the left in FIG. 1 to hold the lever 21 in vertical unlocked position during normal operation. The piston 24' is spring loaded by the spring 26. The spring 26 pressure of the device 24 is chosen or adjusted so that if the air pressure fails the mechanical lock will be applied first before the relay emergency valve operates to apply the brakes. This prevents any possible relaxation of the brakes which would be the case if the sequence were reversed.

The cylindrical member 20 is connected to the brake actuator cylinder 1 by means of springs 30, 31. The purpose of the spring mounting is so that in the event that the lever 21 becomes frozen in locked position then the brakes could still be applied since the springs 30, 31 would yield. This is possible since the lever 21 is connected to the piston 24' by means of a forked connection 29.

The present lock may be connected in the system without any modification of the existing system. Also, the present lock may be applied to as many wheels as desired. The connection of the present invention to the existing system is as follows.

The pressure cylinder 24 is bolted to the existing brake cylinder 1 by removing two or more bolts from the bolt ring 32 and bolting the member 24 thereon. The member 24 is then connected by means of the conduit 25 to the supply or emergency line 5'.

The cylindrical member 20 is attached by disconnecting the rod 2 from the lever 2' and sliding the member 20 on the rod 2. The springs 30, 31 are then connected in any convenient manner, for instance under the existing bolts on the bolt ring 32 of the brake cylinder 1.

In order to operate the present lock conveniently for tractor parking purposes it is desirable to add a dashboard mounted valve 35a which is connected to the supply tank 4. Valve 35a normally applies pressure through line 45 to pressure chamber 24a of mechanical lock 20a on one or more tractor brakes 1a to hold the lock 20a in open position. The valve 35a may be conventional and operates to open the line 45 to the atmosphere and seal tank 4 by pulling the handle out. This operates to apply the mechanical lock. The normal brakes are then set in conventional manner. Then, if the air pressure should leak away while the tractor is parked the mechanical lock will operate to keep all the wheels to which it is connected safely locked.

Many modifications may be made by those who desire to practice the invention without departing from the scope thereof which is defined by the following claims:

I claim:

1. Means for mechanically locking fluid brakes of the type having an emergency valve and a brake actuating rod connected to a brake operating cylinder comprising a cylindrical housing having two end portions, spring means yieldably connecting said housing to said cylinder, a shaftway in each of said end portions along a common axis to fit over said actuating rod, said housing having first and second slots along an axis perpendicular to the axis of said actuating rod, a lever extending through said slots, the portion of said lever inside said housing being larger than said slots so that said lever is retained in said housing, the end of said lever being pivotally mounted in said first slot, said second slot being larger than said first slot to permit rotational motion of said lever, an elongated aperture in said lever adapted to fit over said actuating rod, said opening being generally cylindrical but elongated along said lever axis, a spring mounted around said rod and adapted to hold said lever in tilted, locking position, and piston motor means connected to hold said lever in unlocked position along an axis perpendicular the axis of said rod, said piston motor being connected to the brake supply line.

2. Apparatus as in claim 1 wherein said piston motor means has a spring adjusted to operate at a higher pressure than said emergency valve so that the lock is applied before the brakes are applied.

3. Means for mechanically locking fluid brakes of the type having an emergency valve and a brake actuating rod connected to a brake operating cylinder comprising a cylindrical housing having two end portions, spring means yieldably connecting said housing to said cylinder, a shaftway in each of said end portions along a common axis to fit over said actuating rod, said housing having a slot along an axis perpendicular to the axis of said actuating rod, a lever extending through said slot, the portion of said lever inside said housing being larger than said slot so that said lever is retained in said housing, the end of said lever being pivotally mounted on said housing to permit rotational motion of said lever, an elongated aperture in said lever adapted to fit over said actuating rod, said opening being generally cylindrical but elongated along said lever axis, a spring mounted around said rod and adapted to hold said lever in tilted, locking position, and piston motor means mounted on said brake cylinder connected to hold said lever in unlocked position along an axis perpendicular the axis of said rod, said piston motor being connected to the brake supply line.

References Cited in the file of this patent

UNITED STATES PATENTS

| | | |
|---|---|---|
| 710,522 | Sauvage | Oct. 7, 1902 |
| 1,254,246 | Liedloff | Jan. 22, 1918 |
| 1,484,475 | Crown | Feb. 19, 1924 |
| 2,579,616 | Sahlgaard | Dec. 25, 1951 |
| 2,759,569 | Keehn | Aug. 21, 1956 |
| 2,873,579 | Safford | Feb. 17, 1959 |